Nov. 2, 1937.  A. E. BRONSON  2,097,614

VALVE INSIDES

Filed Dec. 8, 1931

INVENTOR:
ADELBERT E. BRONSON,
Kwis Hudson & Kent.
ATTORNEYS.

Patented Nov. 2, 1937

2,097,614

UNITED STATES PATENT OFFICE 2,097,614

VALVE INSIDES

Adelbert E. Bronson, Cleveland, Ohio, assignor to The Dill Manufacturing Company, Cleveland, Ohio, a corporation of Ohio Application December 8, 1931, Serial No. 579,719

1 Claim. (Cl. 152—12)

This invention relates to valve insides such as are used in the valve stems of pneumatic tires.

An object of the invention is to provide a valve insides which is so constructed that maximum air passages are provided through the valve insides thus permitting quick inflation and deflation of the tire equipped with the insides.

Another object is to provide a valve insides which is of simple construction and may be readily and economically manufactured.

Additional and further objects of the invention will become apparent hereinafter during the following detailed description of several embodiments of the invention.

The embodiments of the invention to be described herein are illustrated in the accompanying drawing, wherein Figure 1 is an elevational view, on a greatly enlarged scale, of a valve insides;

Figure 3:
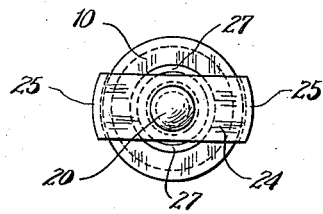
Fig. 3 is a top plan view of the valve insides shown in Fig. 1.

As is well understood in the art, valve insides for the valve stems of pneumatic tires are constructed so that they may be screwed into the bores of the valve stems and include the valves proper and their seats. Since the valve insides are screwed into the bores of the valve stems they must be provided with threaded rotatable parts for this purpose and ordinarily such parts have constituted threaded plugs swivelly connected to the barrels of the insides and having at their outer ends portions through which the valve pins extend and, in some instances, against which the valve springs abut.

In the ordinary or conventional form of valve stem, the bores through the stems are of small diameter necessitating the use of valve insides of extremely small size. Consequently the provision of air passages through the valve insides of sufficient size to permit of quick inflation and deflation of the tire is a major consideration in valve insides design.

The present invention contemplates a valve insides construction wherein provision is made for screwing the valve insides into the valve stem bore that is simple and economical and provides maximum air passages through the valve insides.

Referring to the drawing, the barrel of the valve insides is indicated at 10 and has a tapered inner end 11 forming the seat for the valve proper, later to be referred to, and a bore 12 that extends longitudinally through the barrel. The bore 12 intermediate its ends is provided with a shoulder 13 forming an abutment for one end of the valve spring (later to be referred to). The barrel 10 also has an external annular groove 14 intermediate its ends and within which is arranged a flexible packing 15 which engages the wall of the bore through the valve stem when the insides are screwed into the same to form an air-tight fit between the valve insides and valve stem, as is well understood in the art.

The valve proper of the valve insides comprises a member 16 having in its end adjacent to the end 11 of the barrel, a recess within which is arranged a flexible packing 17 adapted to seat against the end 11 of the barrel 10 when the valve is closed. The valve proper is secured upon the lower end of the valve pin 18.

The valve pin 18 has a tapered enlargement 19 formed thereon and bearing against the packing 17 of the valve proper, the enlargement 19 acting to guide the valve pin 18 when the pin is moved in the barrel 10 and to limit the lateral movement of the lower end of the pin. The valve pin 18 extends through the bore 12 of the barrel 10 and projects beyond the outer end of the barrel and has at its extreme outer end a head 20. Inwardly of the head 20 the pin 18 may have an abutment collar 21 arranged thereon and engaging against an annular shoulder 22 formed on the pin 18.

A valve spring 23 in the form of a coil spring is arranged on the valve pin 18 within the bore 12 of the barrel 10 and has its opposite ends abutting the shoulder 13 and the collar 21, respectively, in this particular instance. It is understood, of course, that the valve spring 23 maintains the valve proper of the valve insides normally seated against the end 11 of the barrel in the form of construction shown in Fig. 2, and that the valve proper and valve pin must be moved against the tension of the spring to unseat the valve proper.

In order to provide an economical construction for enabling the valve insides to be screwed into the bore of the valve stem and one wherein maximum air passages are provided, it is proposed to employ a member which may comprise a relatively thin flat bar 24, having a depth greater than its width and the opposite ends 25 of which are curved to form segments of a circle and are threaded. The length of the bar 24 is such that when the bar is arranged on edge it can be screwed into the bore of a standard or conventional valve stem while its width need only be sufficient that enough leads of the threads on the ends 25 will be provided to enable the bar to take the threads on the wall of the valve stem bore. The bar 24 is provided between its ends with a transverse opening 26 of a diameter slightly greater than the diameter of the valve pin 18 which extends therethrough and is guided therein.

The bar 24 may be readily and economically cut from lengths of bar stock, its opposite ends 25 curved and threaded and the transverse opening 26 drilled therein. The bar 24 is arranged on the valve pin 18 between the shoulder 22 and the head 20, it being understood that the head 20 is formed on the valve pin after the pin has been passed through the opening 26 in the bar 25.

The valve insides described above is inserted in the bore of a valve stem and the bar 24 rotated to engage the threads on the opposite ends 25 thereof with the threads on the wall of the valve stem bore and to screw the bar into the valve stem bore. The bar 24 engages the adjacent end of the barrel 10 as it is screwed into the valve stem and forces the barrel 10 and valve pin 18 longitudinally into the stem, it being remembered that the opening 26 in the bar is slightly larger in diameter than the pin 18 whereby the bar may rotate independently of the pin. When the bar 24 is rotated in the opposite direction, it will move outwardly of the valve stem bore and, engaging with the head 20 of the valve pin 18, will force the pin and the barrel 10 in an outward direction.

The bar 24 needs only to be of a thickness sufficient to enable the drilling of the opening 26 in the bar and, since this opening is just slightly larger in diameter than the diameter of the valve pin 18, it will be seen that the thickness of the bar 24 is much less than the diameter of the upper end of the bore 12 in the barrel 10 and, therefore, maximum air passages 27 (see Fig. 3) are provided at the outer end of the barrel 10.

Figure 2:
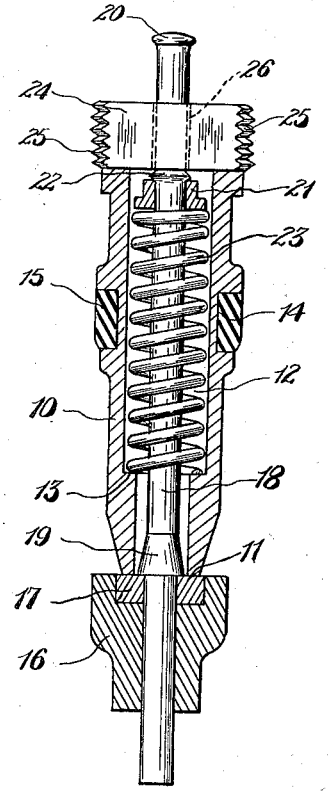
Fig. 2 is a transverse sectional view through the valve insides shown in Fig. 1, and is taken substantially on line 2—2 of Fig. 1, looking in the direction of the arrows.
Figure 1:
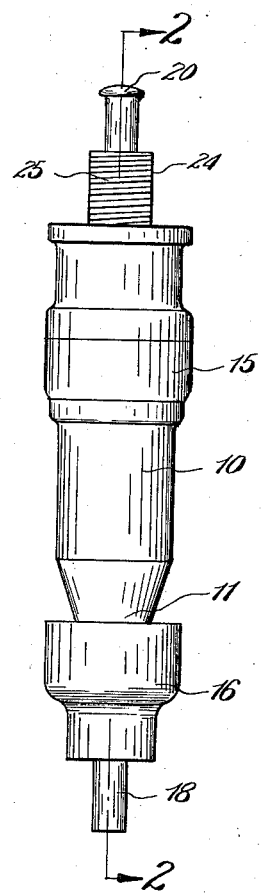
Figure 4:
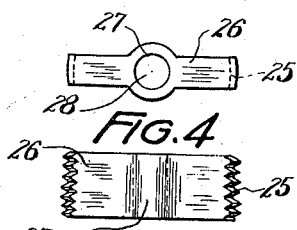
Figs. 4 and 5 are detail top plan and side elevational views of a modified form of swivel.
Figure 5:
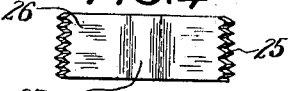

In Figs. 4 and 5 there is disclosed a form of swivel constructed from a bar but differing from the swivel 24, previously described, in that the bar is of less thickness than the diameter of the valve pin 18, thereby affording even greater air passages through the valve insides than in the form of construction shown in Fig. 2. In this modified form of construction, the relatively thin bar 26 has a boss 27 swedged up intermediate the ends of the bar to provide the required thickness and strength for the pin hole 28.

Figure 6:
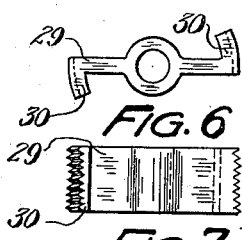
Figs. 6 and 7 are detail top plan and side elevational views of a still further modified form of swivel.
Figure 7:
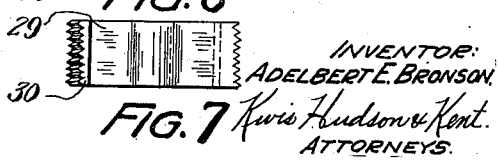

In Figs. 6 and 7 there is disclosed a swivel formed of a bar that is thinner than the bars in either of the two previously described forms of swivel. In this form of swivel the very thin bar 29 has its opposite ends 30 flanged laterally in opposite directions and curved to form arcs of the circular inner periphery of the standard valve stem. These flanged ends of the bar 29 are threaded to enable the bar to be screwed into a valve stem. It will be noted that the flanged ends 30 provide ample thread area and enable the bar to be formed of very thin stock thus increasing the passages through the valve insides.

Although specific embodiments of the invention have been illustrated and described herein, it should be understood that the invention is susceptible of various modifications and adaptations within the scope of the appended claim.

Having thus described my invention, I claim:

A valve insides comprising a barrel having a longitudinal bore therethrough, a valve pin extending through the barrel and having secured thereto adjacent its inner end a valve proper, and a member freely rotatable on said valve pin outwardly of the outer end of the barrel and rotatable relative to said barrel, said member being in the form of a bar having its opposite ends laterally flanged and curved on arcs of the same circle and provided with threads, said member forming the means by which the valve insides may be screwed into a valve stem.

ADELBERT E. BRONSON.